US007385882B2

(12) United States Patent
Nishino et al.

(10) Patent No.: US 7,385,882 B2
(45) Date of Patent: *Jun. 10, 2008

(54) OPTICAL DISK APPARATUS AND METHOD FOR RECORDING DATA BY UTILIZING AN OVERWRITE TECHNIQUE OR A TWO-PATH WRITE TECHNIQUE

(75) Inventors: Masatoshi Nishino, Tokyo (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 515 days.

This patent is subject to a terminal disclaimer.

(21) Appl. No.: 11/055,398

(22) Filed: Feb. 10, 2005

(65) Prior Publication Data

US 2005/0135201 A1 Jun. 23, 2005

Related U.S. Application Data

(63) Continuation of application No. 09/948,222, filed on Sep. 7, 2001, now Pat. No. 6,888,781.

(30) Foreign Application Priority Data

Sep. 8, 2000 (JP) ............................ P2000-278685

(51) Int. Cl.
*G11B 11/00* (2006.01)
(52) U.S. Cl. .................................. 369/13.04
(58) Field of Classification Search .................... None
See application file for complete search history.

(56) References Cited

U.S. PATENT DOCUMENTS

| 4,766,502 | A | | 8/1988 | Mashimo |
| 5,177,717 | A | | 1/1993 | Sato et al. |
| 5,293,361 | A | | 3/1994 | Aizawa |
| 5,461,595 | A | | 10/1995 | Machida |
| 5,625,620 | A | * | 4/1997 | Fukushima et al. ...... 369/275.3 |
| 5,629,912 | A | * | 5/1997 | Okawa et al. ........... 369/44.29 |
| 5,848,043 | A | | 12/1998 | Takada et al. |
| 5,852,595 | A | | 12/1998 | Matsui |
| 6,178,146 | B1 | | 1/2001 | Hogan |
| 6,535,463 | B2 | | 3/2003 | Nishino et al. |

* cited by examiner

*Primary Examiner*—Tan Dinh
(74) *Attorney, Agent, or Firm*—Frommer Lawrence & Haug LLP; William S. Frommer

(57) ABSTRACT

There are provided an optical disk, a magneto-optical disk, a disk apparatus therefor, and a data recording method which can provide improved recording/reproducing characteristics and record durability without linear velocity dependency even if the data access speed is increased by increasing the channel clock frequency. In a disk device for recording data on an optical disk by using a phase change recording scheme, erasing means for erasing data on the optical disk, and recording means for recording other data on the optical disk after the data is erased are provided.

8 Claims, 8 Drawing Sheets

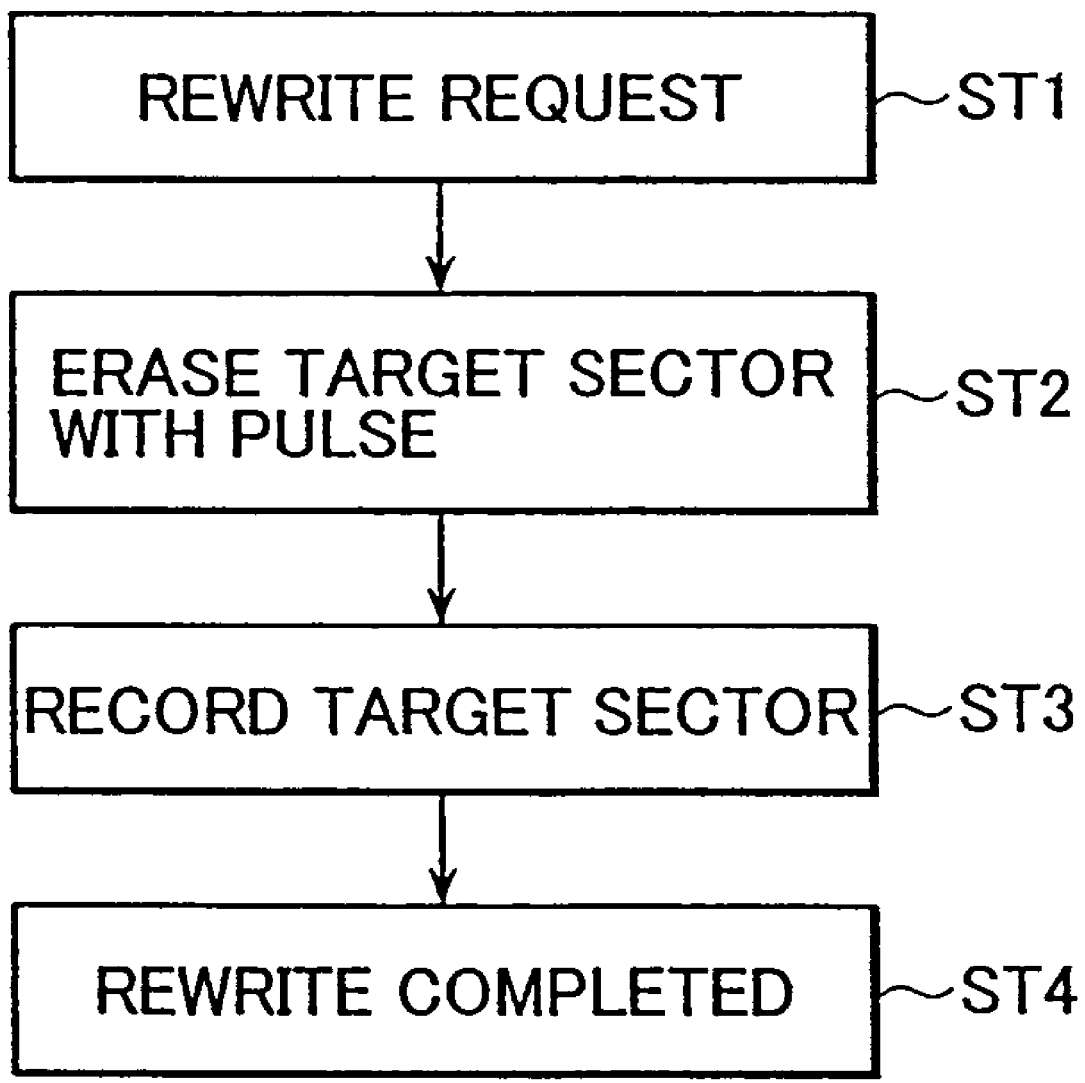

OPTICAL DISK APPARATUS AND METHOD FOR RECORDING DATA BY UTILIZING AN OVERWRITE TECHNIQUE OR A TWO-PATH WRITE TECHNIQUE

This application is a continuation of U.S. application Ser. No. 09/948,222, filed Sep. 7, 2001, now U.S. Pat. No. 6,888,781, which application is hereby incorporated by reference in its entirety herein.

BACKGROUND OF THE INVENTION

The present invention relates to an optical disk and a magneto-optical disk for recording data, a disk apparatus therefor, and a data recording method.

DESCRIPTION OF THE RELATED ART

In recent years, because of the development of information industry, disk apparatuses that can record and reproduce a large capacity of data quickly have been developed one after another. A disk-type recording medium capable of recording data is stored in or removably attached to a disk apparatus. There has been a desire for the disk apparatus to quickly record or reproduce data on the recording medium. In order to realize it, at the time of data recording, recorded data is overwritten by other data to be recorded (hereinafter referred to as "overwrite"). In other words, to overwrite at the time of data recording is to shorten a recording time of data on the recording medium by eliminating an erasing process.

However, when the data on the recording medium is to be replaced by other data, overwriting the data which is on the recording medium with the other data results in an increase in jitter which is generated when the other recorded data is reproduced, and an increase in the error rate of the other recorded data. Therefore, when the data on the recording medium is recorded by an overwriting method, recording/reproducing characteristics and record durability tend to be deteriorated.

For example, recording media such as optical disks of a phase change recording type has a linear velocity dependency, and the channel clock frequency cannot be overly increased, so that data is recorded while rotating the recording medium at a constant linear velocity and under a relatively low channel clock frequency operation. Accordingly, these types of recording media are operated with a linear velocity dependency and with a lower channel clock frequency during data recording, so that it has been difficult to increase a transfer rate of data for recording and reproducing.

SUMMARY OF THE INVENTION

In view of the above-described problems, it is an object of the present invention to provide an optical disk and a magneto-optical disk, and a disk apparatus therefor and a data recording method which does not have linear velocity dependency and which can provide improved recording/reproducing characteristics and record durability without linear velocity dependency or the channel clock frequency even if the data access speed is increased by increasing the channel clock frequency.

The above-described object is achieved by a disk apparatus for recording data on an optical disk by using a phase change recording scheme according to claim 1 of the present invention, the disk apparatus including means for erasing data on the optical disk; and means for recording other data on the optical disk after the data is erased.

According to one configuration, when data is recorded on the optical disk of a phase change recording type, the data recorded thereon is erased first, and then the other data is recorded. Accordingly, when the other data is to be recorded on the optical disk of a phase change recording type, recorded data on the optical disk is erased, and the other data is recorded after the recorded data is completely erased therefrom. As a result, for recording of data on the optical disk of a phase change recording type, it does not need to have linear velocity dependency unlike in the related apparatuses, thus reducing the error rate of the other recorded data and improving recording/reproducing characteristics and record durability.

According to the present invention in the aforenoted configuration, the optical disk rotates at a rate constant to angular velocity.

According to the just-described configuration, in addition to the effect of claim 1, the optical disk of a phase change recording type may rotate at a constant angular velocity because linear velocity dependency no longer exists when recording or reproducing the data. Accordingly, it is possible to record or reproduce data on an optical disk of a phase change recording type when rotating constant to angular velocity, which has been difficult to achieve.

According to the present invention described in the preceding paragraph, erasing of the data and recording of the other data are performed at the time of a verify or other operation as necessary.

According to this configuration, normally, it is possible to record the data quickly and efficiently on the optical disk of a phase change recording type, and when verified or necessarily required, erasing of the data and recording of the other data is performed. Accordingly, the error rate of the recorded other data decreases.

According to the present invention, all data on the optical disk is erased when instructed.

According to the aforementioned configuration, after the data is erased as instructed, it is possible to securely record the other data under good recording/reproducing characteristics and record durability.

The above-described object is achieved by a disk apparatus for recording data on a magneto-optical disk by using a magnetic field modulation recording scheme, the disk apparatus including means for erasing data on the magneto-optical disk; and means for recording other data on the magneto-optical disk after the data is erased.

According to this configuration, when data is recorded on the magneto-optical disk of a magnetic filed modulation recording type, the data recorded thereon is erased first, and then the other data is recorded. Accordingly, when the other data is to be recorded on the magneto-optical disk of a magnetic filed modulation recording type, recorded data on the magneto-optical disk is erased, and the other data is recorded after the recorded data is completely erased therefrom. As a result, for recording of data on the magneto-optical disk of a magnetic filed modulation recording type, it does not need to have linear velocity dependency unlike in the related apparatuses, thus reducing the error rate of the other recorded data and improving recording/reproducing characteristics and record durability.

According to the present invention, the magneto-optical disk rotates at a rate constant to angular velocity.

According to the aforementioned configuration, the magneto-optical disk of a magnetic field modulation recording type may rotate at a constant angular velocity because linear velocity dependency no longer exists when recording or reproducing the data. Accordingly, it is possible to record or reproduce the data on a magneto-optical disk of a magnetic field modulation recording type when rotating constant to angular velocity, which has been difficult to achieve.

According to an embodiment of the present invention, erasing of the data and recording of the other data are performed at the time of a verify or other operation as necessary.

According to the configuration mentioned in the preceding paragraph, normally, it is possible to record the data quickly and efficiently on the magneto-optical disk of a magnetic field modulation recording type, and when verified or necessarily required, erasing of the data and recording of the other data is performed. Accordingly, the error rate of the recorded other data decreases.

According to another configuration, all data on the magneto-optical disk is erased when instructed.

According to the just-mentioned configuration, after the data is erased as instructed, it is possible to securely record the other data under good recording/reproducing characteristics and record durability.

The above-described object is achieved by a data recording method for recording data on an optical disk by using a phase change recording type, the data recording method including a step for erasing data on the optical disk; and a step for recording other data on the optical disk after the data is erased.

According to this invention, when data is recorded on the optical disk of a phase change recording type, the data recorded thereon is erased first, and then the other data is recorded. Accordingly, when the other data is to be recorded on the optical disk of a phase change recording type, recorded data on the optical disk is erased, and the other data is recorded after the recorded data is completely erased therefrom. As a result, for recording of data on the optical disk of a phase change recording type, it does not need to have linear velocity dependency unlike in the related apparatuses, thus reducing the error rate of the other recorded data and improving recording/reproducing characteristics and record durability.

According to an embodiment of the present invention, the optical disk rotates at a rate constant to angular velocity.

According to the aforementioned embodiment, the optical disk of a phase change recording type may rotate at a constant angular velocity because linear velocity dependency no longer exists when recording or reproducing the data. Accordingly, it is possible to record or reproduce the data on an optical disk of a phase change recording type when rotating constant to angular velocity, which has been difficult to achieve.

According to a configuration of the present invention, erasing of the data and recording of the other data are performed at the time of a verify or other operation as necessary.

According to this configuration, normally, it is possible to record the data quickly and efficiently on the optical disk of a phase change recording type, and when verified or necessarily required, erasing of the data and recording of the other data is performed. Accordingly, the error rate of the recorded other data decreases.

According to an embodiment, all data on the optical disk is erased when instructed.

According to this embodiment, after the data is erased as instructed, it is possible to securely record the other data under good recording/reproducing characteristics and record durability.

The above-described object is achieved by a data recording method for recording data on a magneto-optical disk by using a magnetic field modulation recording scheme, the data recording method including a step for erasing data on the magneto-optical disk; and a step for recording other data on the magneto-optical disk after the data is erased.

According to this configuration, when data is recorded on the magneto-optical disk of a magnetic filed modulation recording type, the data recorded thereon is erased first, and then the other data is recorded. Accordingly, when the other data is to be recorded on the magneto-optical disk of a magnetic filed modulation recording type, recorded data on the magneto-optical disk is erased, and the other data is recorded after the recorded data is completely erased therefrom. As a result, for recording of data on the magneto-optical disk of a magnetic filed modulation recording type, it does not need to have linear velocity dependency unlike in the related apparatuses, thus reducing the error rate of the other recorded data and improving recording/reproducing characteristics and record durability.

According to the present invention, the magneto-optical disk rotates at a rate constant to angular velocity.

According to an embodiment, the magneto-optical disk of a magnetic field modulation recording type may rotate at a constant angular velocity because linear velocity dependency no longer exists when recording or reproducing the data. Accordingly, it is possible to record or reproduce the data on a magneto-optical disk of a magnetic field modulation recording type when rotating constant to angular velocity, which has been difficult to achieve.

According to the present invention, erasing of the data and recording of the other data are performed at the time of a verify or other operation as necessary.

According to the configuration mentioned in the preceding paragraph, normally, it is possible to record the data quickly and efficiently on the magneto-optical disk of a magnetic field modulation recording type, and when verified or necessarily required, erasing of the data and recording of the other data is performed. Accordingly, the error rate of the recorded other data decreases.

According to the present invention, all data on the magneto-optical disk is erased when instructed.

According to this configuration, after the data is erased as instructed, it is possible to securely record the other data under good recording/reproducing characteristics and record durability.

The above-described object is achieved by an optical disk capable of recording data by using a phase change recording scheme, wherein a data pattern recorded during a certification process is erased at a time of shipping.

According to this configuration, the optical disk of a phase change recording type is shipped after a certification process. A given data pattern is recorded on the optical disk of a phase change recording type during the certification process. The data pattern recorded during the certification process is erased at the time of shipping, so that all data has been erased from the optical disk. Therefore, when a user records other data on the optical disk, the same effect is obtained as in automatically performing erasing of the data and recording of the other data at separate times. Consequently, it is ensured that the other data is recorded on the optical disk of a phase change recording type after complete erasure of the data, and thus, the error rate of the other recorded data is reduced and recording/reproducing characteristics and record durability are improved.

The above-described object is achieved by a magneto-optical disk capable of recording data by using a magnetic field modulation recording scheme, wherein a data pattern recorded during a certification process is erased at a time of shipping.

According to this configuration, the magneto-optical disk of a magnetic field modulation recording type is shipped after a certification process. A given data pattern is recorded on the magneto-optical disk of a magnetic field modulation recording type during the certification process. The data pattern recorded during the certification process is erased at the time of shipping, so that all data has been erased from the optical disk. Therefore, when a user records other data on the optical disk, the same effect is obtained as in automatically performing erasing of the data and recording of the other data at separate times. Consequently, it is ensured that the other data is recorded on the optical disk of a phase change recording type after complete erasure of the data, and thus, the error rate of the other recorded data is reduced and recording/reproducing characteristics and record durability are improved.

BRIEF DESCRIPTION OF THE DRAWINGS

FIG. 13 is a flowchart illustrating an operation example of a disk drive according to the second embodiment of the present invention.

DETAILED DESCRIPTION OF THE PREFERRED EMBODIMENTS

Hereinafter, preferred embodiments of the present invention will be described in detail with reference to the accompanying drawings.

Note that the following embodiments are presented merely as preferred examples of the present inventions, so that even though various preferred technical limitations are set forth in the following description, the present invention is not limited to these embodiments unless there are specific remarks made to limit the present invention.

FIRST EMBODIMENT

Figure 1:
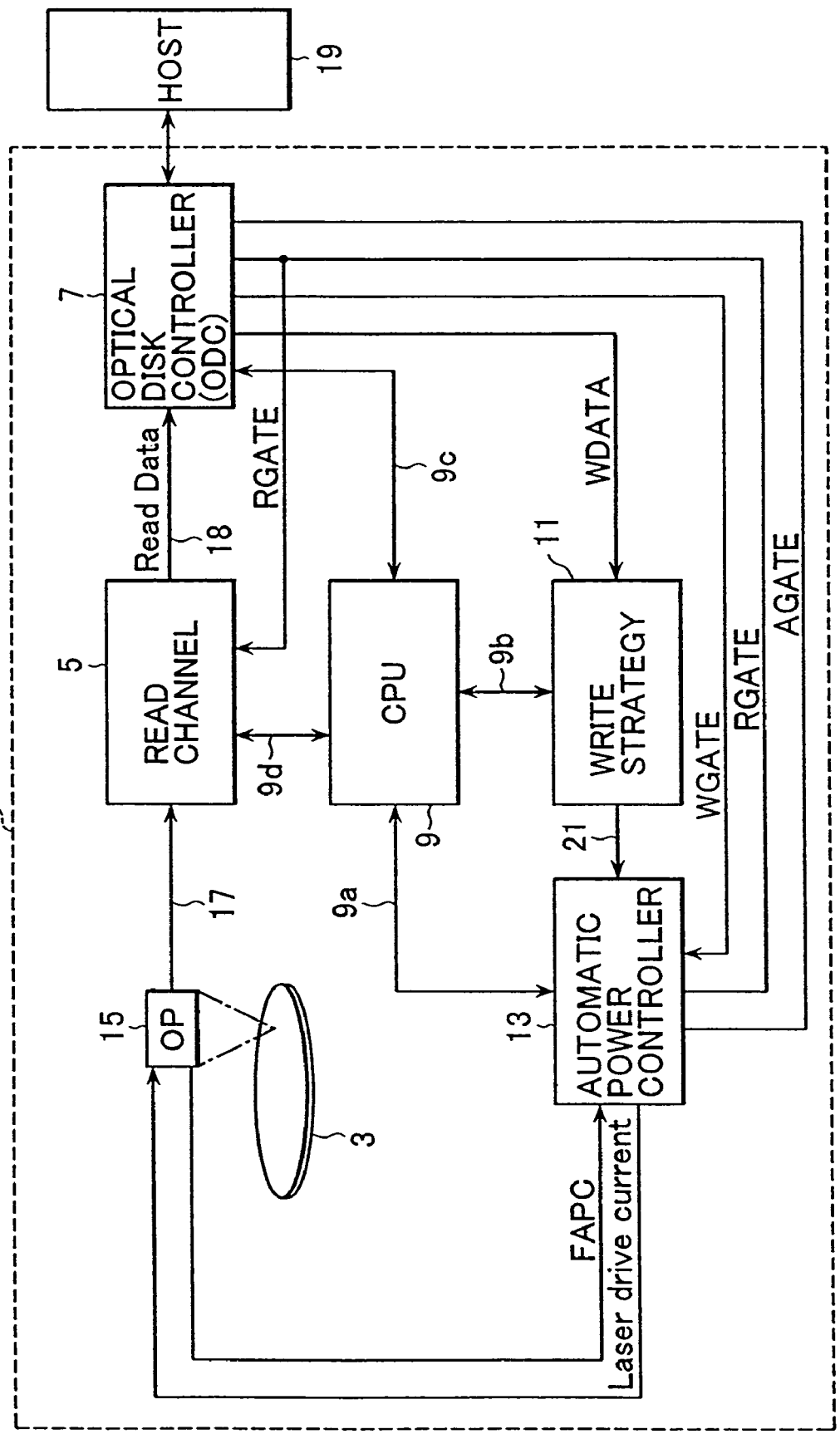
FIG. 1 is a block diagram showing an example of electrical configuration of a disk drive and a host according to the first embodiment of the present invention.

FIG. 1 is a block diagram illustrating an example of electrical configuration of a disk drive 1 and a host 19 in the first embodiment of the present invention.

The disk drive 1 (a disk apparatus) incorporates an optical disk 3, and operates as an apparatus for recording data from the host 19 to the optical disk 3 and reproducing the data from the optical disk 3. It will be appreciated that the optical disk 3 may be detachable to the disk drive 1.

The disk drive 1 includes an optical disk controller 7 (erasing means, recording means), a write strategy 11 (erasing means, recording means), an automatic power controller 13 (erasing means, recording means), a CPU 9 (erasing means, recording means), an optical pickup 15 (erasing means, recording means), and a read channel 5 (erasing means, recording means). The optical disk 3 is, for example, an optical disk of a phase change recording type. Moreover, the optical disk 3 may be, for example, a magneto-optical disk with a magnetic field modulation recording type instead of an optical disk of a phase change recording type.

The disk controller 7 defines a central portion which for controls the operation of the disk drive 1. In addition, the disk controller 7 has the functions of interfacing with the host 19, and controlling the CPU 9, encoding and decoding of modulation codes, and issuing instructions such as record, reproduce and erase.

The write strategy 11 is a block which generates a light emission pattern for the laser power of the optical pickup 15 corresponding to a recording data pattern 21. A WDATA signal is inputted to the write strategy 11. The WDATA signal indicates a recording data pattern.

The automatic power controller 13 has the function of controlling the laser power. A WGATE signal, an RGATE signal and an AGATE signal from the optical disk controller 7, are inputted to the automatic power controller 13. The automatic power controller 13 supplies a laser drive current to the optical pickup 15, and receives an FAPC signal therefrom. The WGATE signal is a signal representing a data recording command, the RGATE signal is a signal representing a data reproduction command, and the AGATE signal is a signal representing a regulation command for the laser power. The laser drive current is a signal for controlling the power of laser light emitted by which the optical pickup 15. The FAPC signal, which is a return signal from a front photodetector (PD) of the optical pickup 15, is necessary for realizing auto power control (APC). The front photodetector has the function of monitoring the current level of power of the laser.

The read channel 5 has the functions of binarizing an RF signal 17 and reproducing read data 18.

CPU 9 has the functions of performing various calculations according to commands from the optical disk controller 7, and setting various parameters in the automatic power controller 13, the write strategy 11, and the read channel 5. Usually, each of these blocks is composed of a large scale integration (LSI), for example, and parameters of each block are set by using registers. The optical pickup 15 can record data or reproduce recorded data by irradiating laser light on the rotating optical disk 3.

The disk drive 1 has the above configuration. Next, an example of recording operation of the disk drive 1 will be briefly described.

The recording laser power requires for recording data on the optical disk 3 is determined by a value which is set in a register included in the automatic power controller 13. The value is previously set by the CPU 9. When recording data on the optical disk 3, the optical disk controller 7 transmits two digital signals: the WGATE signal as a data recording command and the WDATA signal as a recording data pattern to the power controller 13 and the write strategy 11, respectively. The automatic power controller 13 and the write strategy 11 receive the respective signals, and cause a laser element in the optical pickup 15 to irradiate based on the previously-set recording laser power value. Accordingly, the data is recorded on the optical disk 3.

Traditional Data Recording Method

A traditional recording/reproducing method for the optical disk 3 adopting a phase change recording type, for example, will be described therebelow.

Figure 2:
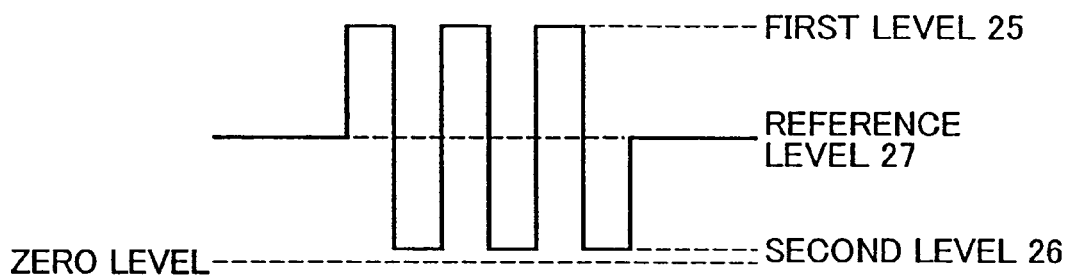
FIG. 2 is a diagram illustrating one example of laser pulse light emission waveform at the time of data recording for an optical disk.

FIG. 2 is a diagram showing one example of the light emission waveform of laser pulses during data recording to the optical disk 3.

The optical disk 3 of a phase change recording type takes an amorphous state when a target sector as a data recording region of a recording film deposited on the surface of the optical disk 3 (hereinafter simply referred to as "a recording film") is heated at a high temperature of 600° C. or more, for example, above the melting point of the recording film and then rapidly cooled down, molecules of the material composing the recording film are solidified in a dispersed state. Moreover, when the recording film of the optical disk 3 is subjected to a temperature of about 400° C., the molecules of the material composing the recording film take an aligned crystal state. In other words, the recording film of the optical disk 3 may take either an amorphous state or a crystal state.

These amorphous state and crystal state are different in terms of their reflectivity. The amorphous state and the crystal state in the recording film of the optical disk 3 correspond to recording marks (hereinafter referred to as "marks") and spaces other than the marks. Whether which state corresponds to the mark or the space depends on the system configuration of the disk drive 1 and the material of the media. As an example, the following description herein will be directed to the case where the marks correspond to the amorphous state whereas the spaces correspond to the crystal state.

When the data recorded on the optical disk 3 is reproduced, the difference in reflectivity level is utilized. The optical pickup 15 in FIG. 1 detects the reflectivity difference.

On the other hand, when data is recorded on the optical disk 3, the optical pickup 15 in FIG. 1 irradiates light having the recording pulse waveform shown in FIG. 2 on the optical disk 3. As a result, due to the pulse effect (rapid cooling) between the first level 25 and the second level 26, the recording film of the optical disk 3 in FIG. 1 enters an amorphous state. Meanwhile, when the recording pulse waveform having an annealing effect (e.g., the reference level 27) in FIG. 2 is irradiated on the optical disk 3, the recording film of the optical disk 3 enters the crystal state.

Thus, the fundamental method of recording/reproducing data on the optical disk 3 has been described. In the above manner, the marks (which are in the amorphous state) and the spaces (which are in the crystal state) are formed on the recording film of the optical disk 3. Moreover, by recording data in the above-described recording method, the optical pickup 15 could overwrite any existing recorded data on the optical disk 3 with other data.

Data Recording Method in the First Embodiment

Hereinafter, a data recording method of the disk drive 1 according to the first embodiment will be described. The recording method according to the first embodiment is characterized in that the recording method separately includes an erasing step for erasing data on the optical disk 3 and a recording step for recording other data on the optical disk 3 from which data has been erased. Hereinafter, the method of recording data on the optical disk 3 in such two steps of data erasing and data recording will be referred to as a "two-path write technique".

Figure 3:
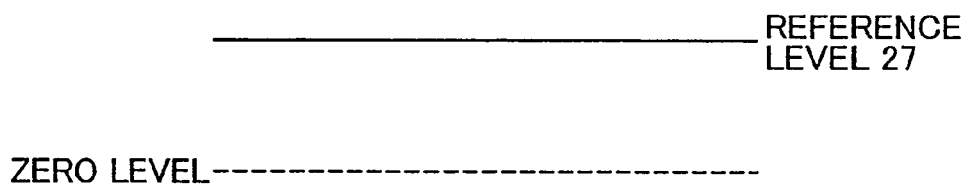
FIG. 3 is a diagram illustrating one example of light emission waveform for erasing recorded data on the optical disk.
Figure 4:
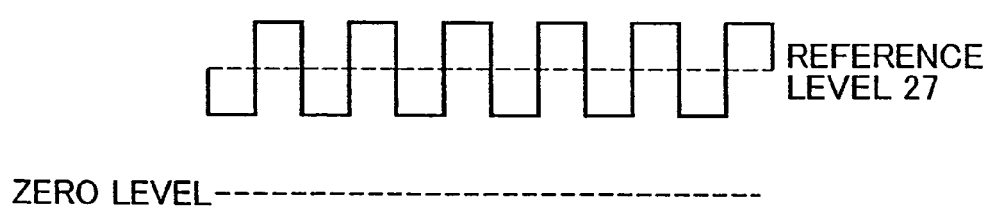
FIG. 4 is a diagram illustrating one example of light emission waveform for erasing recorded data on the optical disk.

FIGS. 3 and 4 are diagrams each showing one example of the light emission waveform for erasing recorded data on the optical disk 3. Note that the light emission waveforms shown in FIGS. 3 and 4 are merely examples, an it should be appreciated that any waveform which provides an annealing effect may be used therefor.

The above-described two-path write technique can be realized in the following manner: First, a target sector in the recording film of the optical disk 3 is placed in a crystal state (i.e., an erased state, where the entire sectors defines a space as opposed to a mark) by using the light emission waveform shown in FIG. 3 or FIG. 4; and with the recording pulse waveform shown in FIG. 2, the data is recorded on the target sector.

Figure 5:
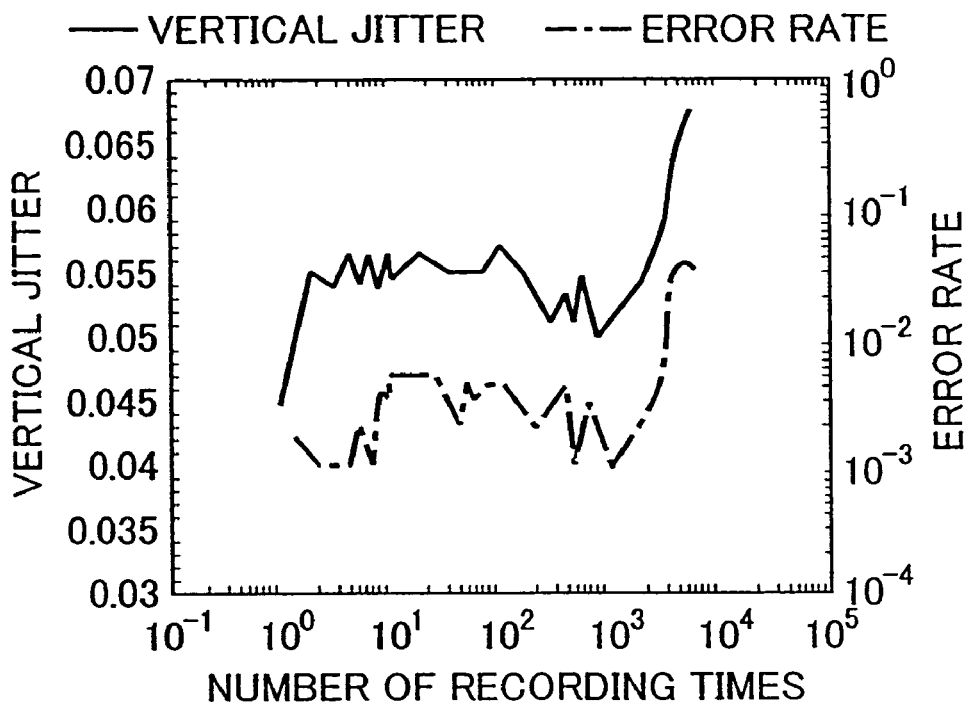
FIG. 5 is a diagram illustrating an evaluation example of record durability of the recorded data on the optical disk.
Figure 6:
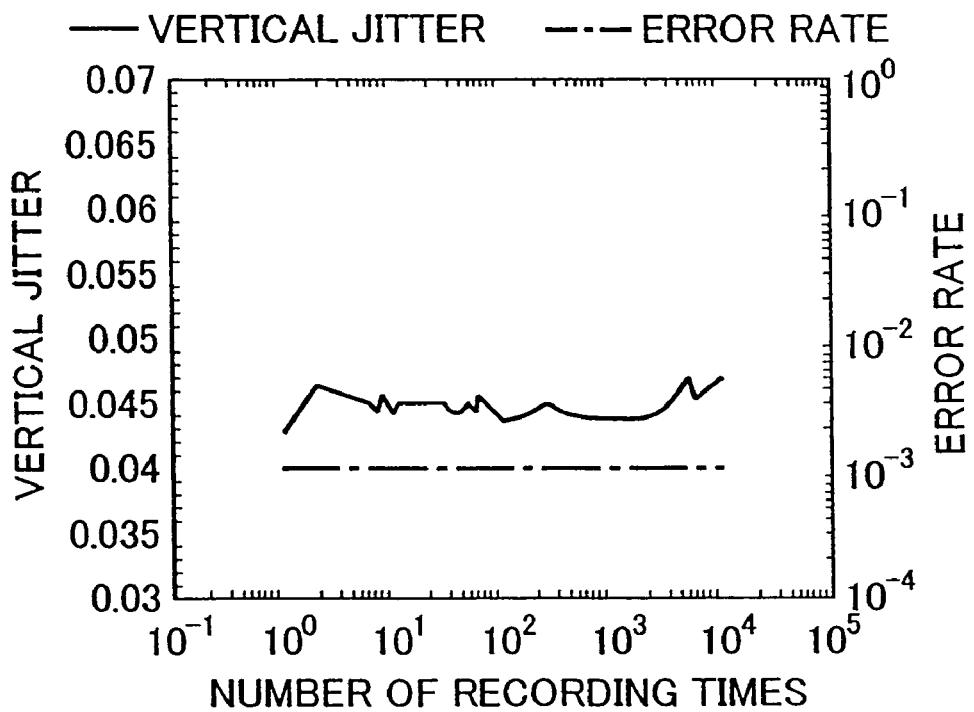
FIG. 6 is a diagram illustrating an evaluation example of record durability of the recorded data on the optical disk.

FIGS. 5 and 6 are diagrams each showing an evaluation example of record durability of data recorded on the optical disk 3. FIG. 5 shows a case where data is recorded by using the related overwrite technique, whereas FIG. 6 shows a case where data is recorded by using the two-path write technique.

Conditions employed for these evaluation examples were as follows: the laser wavelength of the optical pickup 15 was in blue to violet regions, the numerical aperture (NA) was 0.85, and the number of recording times was 10000. The vertical axis in FIGS. 5 and 6 represents the vertical jitter and the error rate (byte error rate). The horizontal axis represents the number of recording times made to the optical disk 3 represented on a logarithmic scale. The term "vertical jitter" as used herein means a jitter of the amplitude direction, and is employed as opposed to a "horizontal jitter", which refers to a jitter along the phase direction. Roughly speaking, the vertical jitter is preferably equal to or less than 0.05. If the vertical jitter is equal to or less than 0.05, the bit error when using the optical disk 3 becomes substantially negligible.

Referring to the evaluation result, in the case of the overwrite scheme shown in FIG. 5, the vertical jitter exceeds 0.05 at the second time of recording and thereafter, and the error rate is not stable. On the contrary, in the case of the two-path write technique shown in FIG. 6, the vertical jitter is maintained equal to or less than 0.05 until the 10000th time of recording, and the error rate is stable.

Experiment on Linear Velocity Dependency and the Channel Clock Frequency

Now, the linear velocity/channel clock frequency dependency of the optical disk 3 will be discussed.

Figure 7:
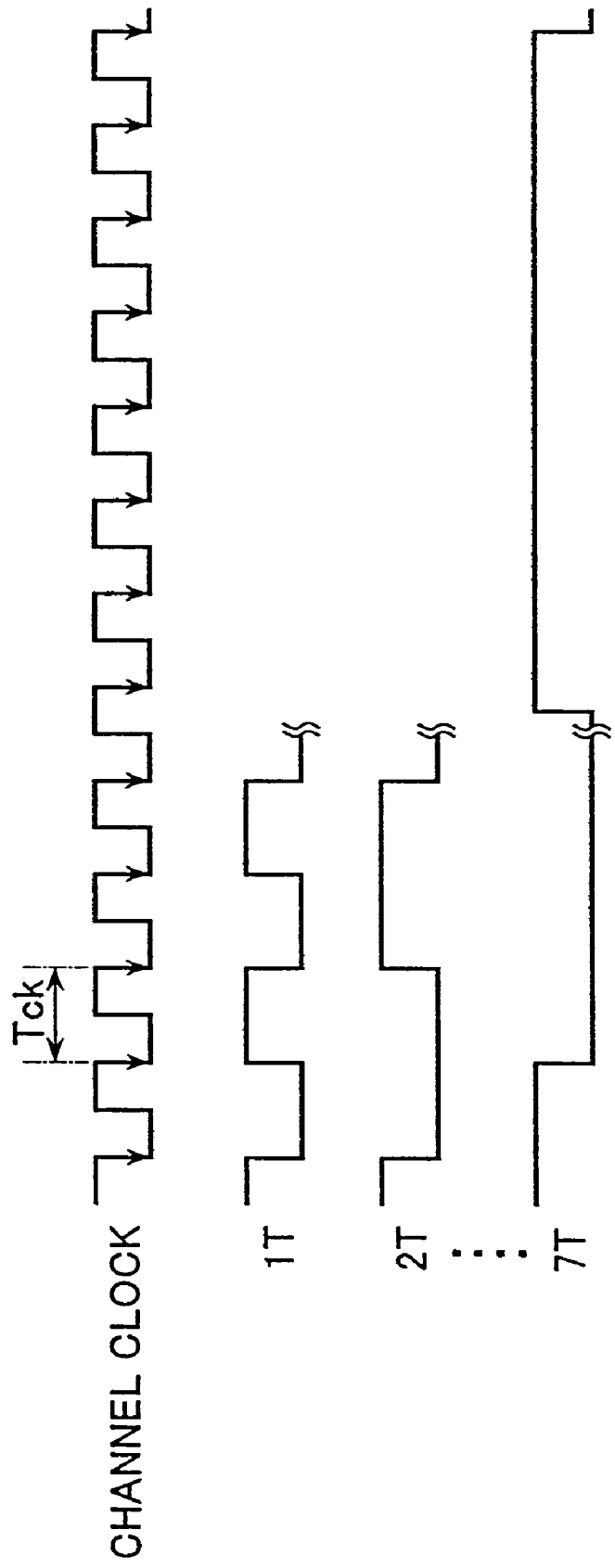
FIG. 7 is a diagram illustrating one example of a channel clock frequency.

Two values of linear velocity, two values of channel clock frequency, two data recording patterns are prepared, and combinations of those were used in the examination discussed below. For the channel clock frequency Tck as shown in FIG. 7, a data recording pattern 2T or a data recording pattern 2T single (single 2T) corresponding to the minimum mark, and a data recording pattern 7T or a data recording pattern 7T single (single 7T) corresponding to the maximum mark are prepared. The reason for using the data recording pattern 2T or the data recording pattern 2T single as the data recording pattern corresponding to the minimum mark is to indicate that the pattern comprises a repetition of the 2T marks and 2T spaces. Likewise, the reason for employing 7T instead of 8T, as the data recording pattern corresponding to the maximum mark is that a data recording pattern of 8T would have the same period as that of the data recording pattern 2T and thus cause interference. As used herein, the data recording pattern 8T means a data recording pattern 8T or data recording pattern 8T single (single 8T), similarly to the data recording patterns 2T and 7T.

When the channel clock frequency (channel clock) Tck in FIG. 7 is 100 MHz, it has a period of 10 ns. Accordingly, the data recording pattern T has a frequency of 50 MHz and a period of 20 ns. Also, the data recording pattern 2T has a frequency of 25 MHz and a period of 40 ns. Any reference to the "data recording pattern 2T" is intended to mean a repetition of the marks and spaces. When a recorded result of the data recording pattern 2T is observed with spectrum analyzer, a carrier at 25 MHz is confirmed.

FIGS. 8 to 11 are diagrams showing examples of recording/reproducing characteristics which were evaluated based on various combinations of linear velocity and channel clock frequency.

As examples, 5.72 m/s and 8.67 m/s are used for linear velocity, and 66 MHz and 100 MHz are used for the channel clock frequency. As for the data recording type, a case where a target sector in which the data of the data recording pattern 7T is recorded is overwritten by other data of the data recording pattern 2T; and a case where the data in a target sector carrying data of the data recording pattern 7T is erased before other data of the data recording pattern 2T is recorded therein are illustrated as examples.

Figure 8:
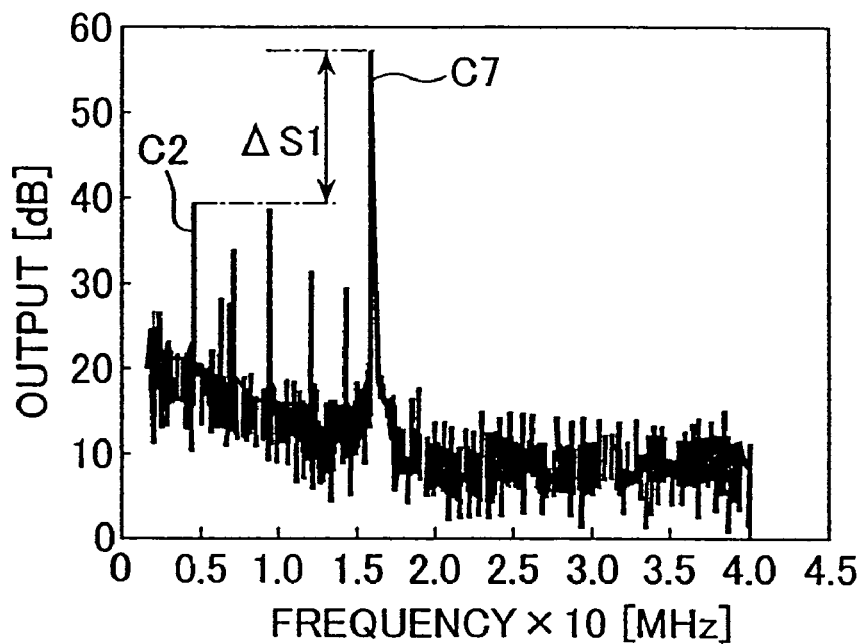
FIG. 8 is a diagram illustrating exemplary recording/ reproducing characteristics evaluated based on combinations of linear velocity and channel clock frequencies.
Figure 9:
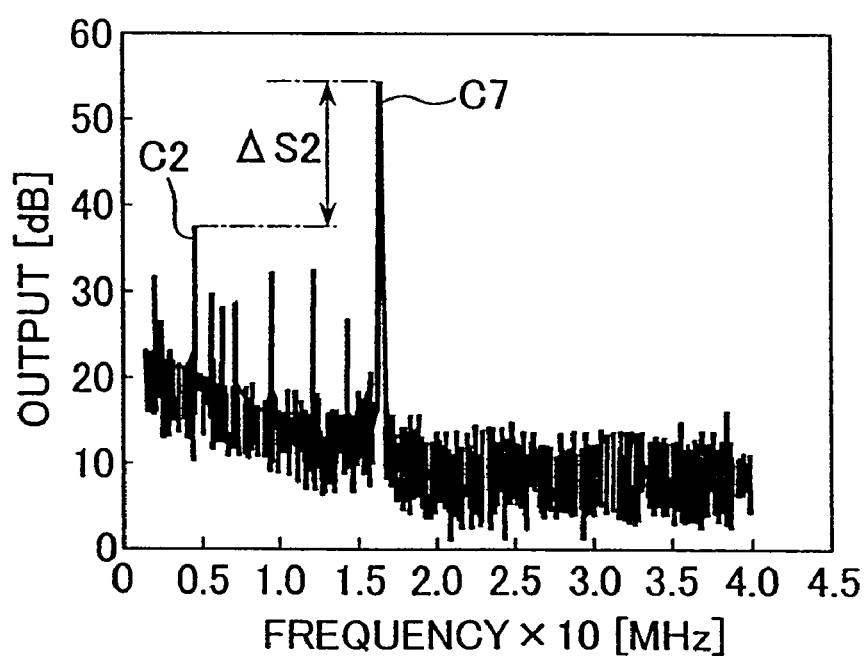
FIG. 9 is a diagram illustrating exemplary recording/ reproducing characteristics evaluated based on combinations of linear velocity and channel clock frequencies.

Specifically, FIG. 8 is an experimental example of the case where data of the data recording pattern 7T is first recorded with a linear velocity of 5.72 m/s and a channel clock frequency of 66 MHz, and then the same target sector is overwritten with other data of the data recording pattern 2T. Likewise, FIG. 9 is an experimental example of the case where data of the data recording pattern 7T is first recorded with a linear velocity 5.72 m/s and a channel clock frequency of 66 MHz, then the recorded data is erased, and lastly other data of the data recording pattern 2T is recorded in the same target sector.

Figure 10:
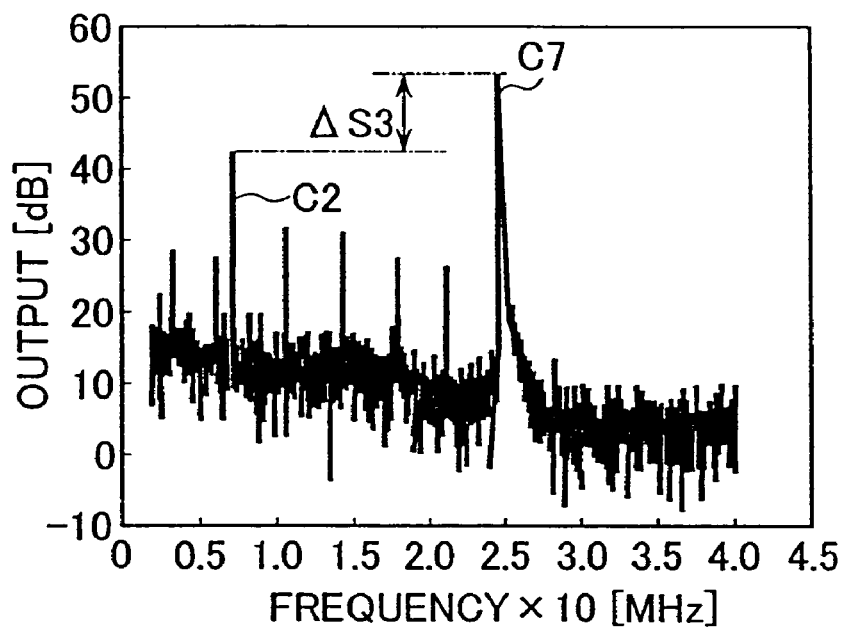
FIG. 10 is a diagram illustrating exemplary recording/ reproducing characteristics evaluated based on combinations of linear velocity and channel clock frequencies.
Figure 11:
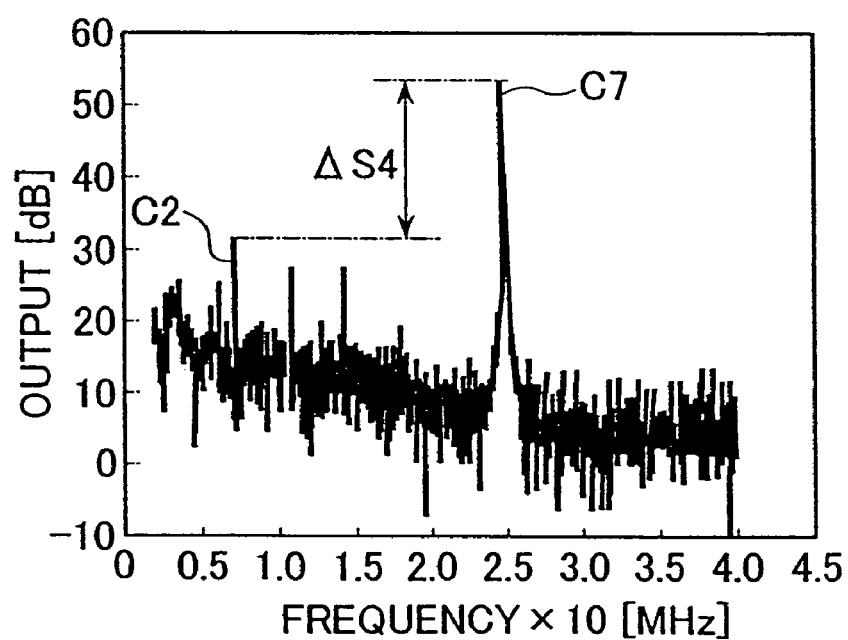
FIG. 11 is a diagram illustrating exemplary recording/ reproducing characteristics evaluated based on combinations of linear velocity and channel clock frequencies.

FIG. 10 is an experimental example of the case where data of the data recording pattern 7T is first recorded with a linear velocity of 8.67 m/s and a channel clock frequency of 100 MHz, and then the same target sector is overwritten with other data of the data recording pattern 2T. Likewise, FIG. 11 is an experimental example of the case where data of the data recording pattern 7T is first recorded with a linear velocity 8.67 m/s and a channel clock frequency of 100 MHz, then the recorded data is erased, and lastly other data of the data recording pattern 2T is recorded in the same target sector.

Thus, after the data of the data recording pattern 7T is recorded, the data was either erased (two-path write technique) or not erased (overwrite technique). The point of the experiment is to see the difference between a carrier associated with the other data (of the data recording pattern 2T) to be recorded next and a carrier associated with the data (of the data recording pattern 7T left unerased) in the two cases. The greater the difference between the carriers, the better the recording/reproducing characteristics are.

In general, the optical disk of a phase change recording type is said to have linear velocity dependency at the time of data recording and data reproducing. The linear velocity and the channel clock frequency used in the experimental examples of FIGS. 8 and 9 represent conditions under which the data recording/reproducing characteristics (overwrite characteristics) for the optical disk 3 are supposed to become optimum.

When these experimental examples are compared with reference to FIGS. 8 and 9, the difference $\Delta S1$ between a first carrier C7 associated with the data recording pattern 7T and a second carrier C2 associated with the data recording pattern 2T in the overwrite scheme is not substantially different from the difference $\Delta S2$ between a first carrier C7 associated with the data recording pattern 7T and a second carrier C2 associated with the data recording pattern 2T in the two-path write technique. However, when FIG. 10 and FIG. 11 are compared, which represent exemplary cases where the linear velocity and the channel clock frequency are increased to 1.5 times as much of those in FIGS. 8 and 9, it can be seen that while the difference $\Delta S3$ between the above-described first carrier C7 and the second carrier C2 in the overwrite technique of FIG. 10 is only about 12 dB, the difference $\Delta S4$ between the first carrier C7 and the second carrier C2 in the two-path write technique is about 22 dB. A greater difference between the carriers is indicative of higher certainty with which data can be rewritten by other data.

Generally, because a disk drive for an optical disk of a phase change recording type has linear velocity dependency, such a disk drive is often opposed with a constant linear velocity (CLV). This is because if such a disk drive was operated with a constant angular velocity, the recording/reproducing characteristics for target sectors at the outer circumference of the optical disk 3 of a phase change recording type would become undesirable. In contrast, the disk drive 1 according to the first embodiment of the present invention, which employs the two-path write technique, has a reduced linear velocity dependency as shown in FIG. 11; therefore, it is possible to employ a constant angular velocity (CAV). With this configuration, it is possible for the disk drive 1 to access the data on the optical disk 3 with an increased access speed, which is an advantage associated with the CAV mode. Therefore, the disk drive 1 can record and reproduce data on the optical disk 3 with a high speed.

The configuration of the disk drive 1 and the data recording method for use with the disk drive 1 has been described above. Now, with reference to FIGS. 1 to 11, operation of the disk drive 1 will be described.

Figure 12:
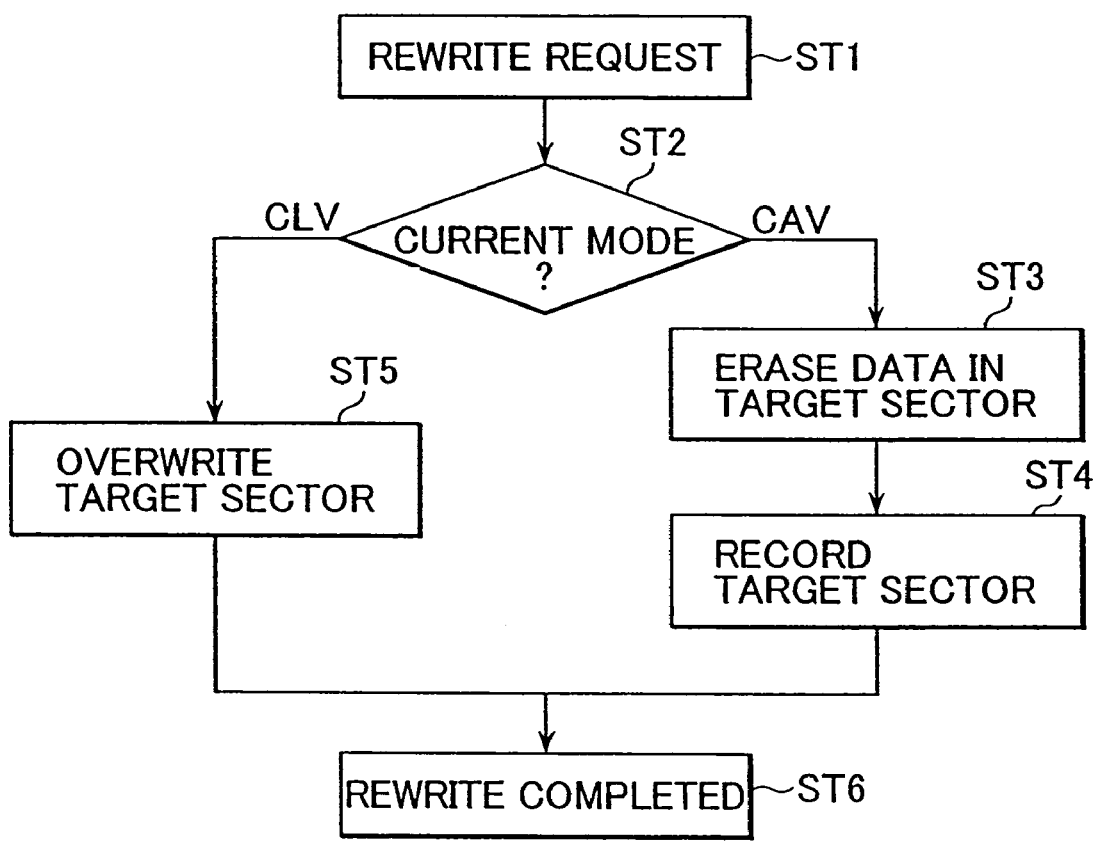
FIG. 12 is a flowchart illustrating an operation example of a disk drive.

FIG. 12 is a flowchart illustrating an operation example of the disk drive 1.

In Step ST1 of FIG. 12, the disk drivel in FIG. 1 receives a rewrite request command from the host 19. In Step ST2 of FIG. 12, the disk drive 1 determines the current rotation mode ("mode") of the optical disk 3. If the mode is constant angular velocity (CAV), then the process proceeds to Step ST3. If the mode is constant linear velocity (CLV), then the process proceeds to Step ST5.

In step ST3 of FIG. 12, existing recorded data in a target sector, in which recording other data is to be recorded, is erased with pulses as shown in FIG. 3 or 4. Next, in step ST4 of FIG. 12, the other data is recorded in the target sector, thus completing rewriting of data (step ST6). On the other hand, in step ST5 of FIG. 12, the data in the target sector, in which other data is to be recorded, is overwritten with the other data, thus completing rewriting of the data (step ST6).

Accordingly, the disk drive 1 can select either the overwrite technique or the two-path write technique depending on the current mode. Therefore, the disk drive 1 can record the data on the optical disk 3 efficiently and appropriately for any given situation. Even in this case, the disk drive 1 may select the two-path write technique to attain improved recording/reproducing characteristics and improved record durability as described above.

According to the first embodiment of the present invention, the data recording/reproducing characteristics for the optical disk 3 can be improved, and the jitter at the time of recording data to the optical disk 3 can be reduced so that the data error rate can be reduced. As a result, linear velocity and channel clock frequency may be increased, thus improving the data access speed. Moreover, according to the first embodiment, the record durability of the data recorded on the optical disk 3 can be improved. CAV or like applications can be employed even for the optical disk 3 of a phase change recording type or the like having high linear velocity dependency, thus providing a greater variety of usage for users.

SECOND EMBODIMENT

A disk drive 1a in the second embodiment has substantially the same configuration and characteristics of the disk drive 1 in the first embodiment as shown in FIGS. 1 to 11. Therefore, the same reference numerals as those used in FIGS. 1 to 11 will be applied to like configuration and like characteristics, and the following description will focus on the differences.

Whereas the disk drive 1a according to The first embodiment performs normal data recording using the above-described two-path write technique, the disk drive 1a according to The second embodiment basically employs the overwrite scheme when recording data on the optical disk 3, but performs the two-path write technique at the time of a verify or other operation as necessary.

FIG. 13 is a flowchart illustrating an operation example of the disk drive 1a according to the second embodiment.

In the procedure shown in FIG. 13, the same steps as those in the procedure of FIG. 12 will be denoted by the same reference numerals, and the description will focus on the differences.

As has been described above, the disk drive 1a performs the two-path write technique at the time of a verify or other operation as necessary, but normally uses the overwrite scheme to record data in the optical disk 3. Therefore, the disk drive 1a can perform high speed recording by using the overwrite technique during usual recording of data to the optical disk 3 and can reduce the data error rate by using the two-path write technique at the time of verify or other operation as necessary.

According to the second embodiment of the present invention, in addition to substantially the same effect of the first embodiment, data can be recorded to the optical disk 3 efficiently and rapidly by adopting the two-path write technique as necessary, thus reducing the error rate of the recorded data. Moreover, if the verify operation determines a target sector to be no good, the target sector would have been replaced. However, according to the second embodiment of the present invention, the recording/reproducing characteristics and the record durability can be improved by the two-path write technique, so there is no need to replace the target sector, thus increasing the number of target sectors which can be used as they are.

Variant

Generally, a magneto-optical disk of a magnetic field modulation recording type or an optical disk of a phase change recording type is shipped after being subjected to a certification process. The certification process is a process of registering any error information (defective sectors) found in the examination in a primary defect list (PDL) before shipping of the optical disk. The defective sectors of the optical disk recorded during the certification process are not used for the actual data recording/reproducing after shipping. By doing so, the optical disk attains a reduced error rate for recorded data, thus obtaining better reliability.

Meanwhile, a predetermined data pattern to be used for certification is usually written to the optical disk 3 during the certification process, and the optical disk 3 is shipped in that state. According to the present variant, the above-described predetermined data pattern in the optical disk 3 is erased after the certification process, so that the optical disk 3 is shipped with its entire surface in a crystal state.

In this manner, all the data in target sectors of on the optical disk 3 has been erased by the time of shipping. When a user records other data to the optical disk 3 after shipping, the same effect is obtained as in automatically performing erasing of the above-described data and recording of the other data at separate times. Consequently, it is ensured that the other data is recorded on the optical disk 3 after complete erasure of the data, and the error rate of the other recorded data is reduced and the recording/reproducing characteristic and record durability are improved. Accordingly, the performance of applications such as CCW (Continuous Composite Write-Once), for example, which is used logically as a write-once recording medium by utilizing processing programs and the like providing in the disk drive can be improved. As used herein, a CCW is a pseudo write-once recording medium which relies on the sector control by the disk drive.

The disk drive uses a command such as "Blank Check" and the like for the CCW-type recording medium to check if there is any recorded data thereon, thus realizing a write-once type function. In this case, the above-described optical disk from which a given data pattern recorded during a certification process is erased records data only once, which is advantageous in terms of the disk characteristics.

It will be appreciated that the present invention is not limited to the embodiments described above.

In the optical disk of a phase change recording type or the magneto-optical disk of a magnetic field modulation recording type in the above-described embodiments, any data recorded at the inner circumference may be read during linear velocity constant rotation and any data recorded at the outer circumference may be read during angular velocity constant rotation.

The respective configurations of the above-described embodiments may be altered by omitting a part thereof or combining components thereof differently.

What is claimed is:

1. A disk apparatus for recording first data on a magneto-optical disk by using a magnetic field modulation recording scheme, said disk apparatus comprising:

selecting means for selecting either an overwrite technique or a two-path write technique depending on a rotation mode of said magneto-optical disk;

erasing means for erasing said first data from said magneto-optical disk when said two-path write technique is selected; and recording means for recording second data on said magneto-optical disk after said first data is erased.

2. The disk apparatus according to claim 1, wherein said magneto-optical disk rotates at a rate constant to angular velocity when said two-path write technique is selected.

3. The disk apparatus according to claim 1, wherein erasing of said first data and recording of said second data are performed at the time of a verify operation.

4. The disk apparatus according to claim 1, wherein all data on said magneto-optical disk is erased when instructed.

5. A data recording method for recording first data on a magneto-optical disk by using a magnetic field modulation recording scheme, said data recording method comprising the steps of:

selecting either an overwrite technique or a two-path write technique depending on a rotation mode of said magneto-optical disk;

erasing said first data from said magneto-optical disk when said two-path write technique is selected; and recording second data on said magneto-optical disk after said first data is erased.

6. The data recording method according to claim 5, wherein said magneto-optical disk rotates at a rate constant to angular velocity when said two-path write technique is selected.

7. The data recording method according to claim 5, wherein erasing of said first data and recording of said second data are performed at the time of a verify operation.

8. The data recording method according to claim 5, wherein all data on said magneto-optical disk is erased when instructed.

* * * * *